US012722339B2

(12) United States Patent
Sato

(10) Patent No.: US 12,722,339 B2
(45) Date of Patent: Sep. 1, 2026

(54) IMPRINT SYSTEM, SUBSTRATE, IMPRINT METHOD, REPLICA MOLD MANUFACTURING METHOD, AND ARTICLE MANUFACTURING METHOD

(71) Applicant: CANON KABUSHIKI KAISHA, Tokyo (JP)

(72) Inventor: Hiroshi Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 18/327,138

(22) Filed: Jun. 1, 2023

(65) Prior Publication Data

US 2023/0415403 A1 Dec. 28, 2023

(30) Foreign Application Priority Data

Jun. 28, 2022 (JP) ................................ 2022-103246

(51) Int. Cl.
*B29C 59/00* (2006.01)
*B29C 59/02* (2006.01)

(52) U.S. Cl.
CPC .......... *B29C 59/002* (2013.01); *B29C 59/022* (2013.01); *B29C 59/026* (2013.01)

(58) Field of Classification Search
CPC ... B29C 59/002; B29C 59/022; B29C 59/026; G03F 7/0002; G03F 7/0015; G03F 9/7042; G03F 9/708
See application file for complete search history.

(56) References Cited

U.S. PATENT DOCUMENTS 8,967,992 B2 * 3/2015 Khusnatdinov ........ B82Y 40/00 428/173
12,174,403 B2 * 12/2024 Li ....................... B29C 33/3842
2009/0315223 A1 * 12/2009 Yoneda .................. B82Y 10/00 264/402

(Continued)

FOREIGN PATENT DOCUMENTS

JP 2000323461 A 11/2000
JP 2010171160 A 8/2010

(Continued)

OTHER PUBLICATIONS

Office Action issued in Korean Appln. No. 10-2023-0077190 mailed Sep. 19, 2025.

*Primary Examiner* — Nahida Sultana
(74) *Attorney, Agent, or Firm* — ROSSI, KIMMS & McDOWELL LLP

(57) ABSTRACT

An imprint system transfers a pattern formed on a mold to an imprint material supplied onto a substrate and includes: a formation unit configured to form a desired substrate-side mark including a predetermined material by applying the predetermined material onto the surface of the substrate and then transferring the substrate-side mark on the predetermined material and processing the substrate-side mark, wherein a difference in a predetermined optical property between the predetermined material and the imprint material is larger than a difference in the predetermined optical property between the imprint material and the substrate; and an alignment unit configured to align the substrate-side mark including the predetermined material and a mold-side mark provided on the mold.

7 Claims, 8 Drawing Sheets

(56) References Cited

U.S. PATENT DOCUMENTS

| | | | | |
|---|---|---|---|---|
| 2012/0112370 | A1* | 5/2012 | Kobayashi | H10W 46/00 257/E23.179 |
| 2012/0269972 | A1* | 10/2012 | Khusnatdinov | B82Y 10/00 427/277 |
| 2013/0241096 | A1* | 9/2013 | Shudo | B82Y 40/00 264/40.5 |
| 2014/0340660 | A1* | 11/2014 | Suzuki | G03F 7/0002 355/53 |
| 2015/0325526 | A1* | 11/2015 | Hayashi | B82Y 40/00 264/40.5 |
| 2018/0136557 | A1* | 5/2018 | Sato | G03F 7/7085 |
| 2018/0253000 | A1* | 9/2018 | Saito | G03F 7/0002 |

FOREIGN PATENT DOCUMENTS

| | | | |
|---|---|---|---|
| JP | 2011140225 | A | 7/2011 |
| KR | 1020160063359 | A | 6/2016 |
| KR | 1020200115139 | A | 10/2020 |

* cited by examiner

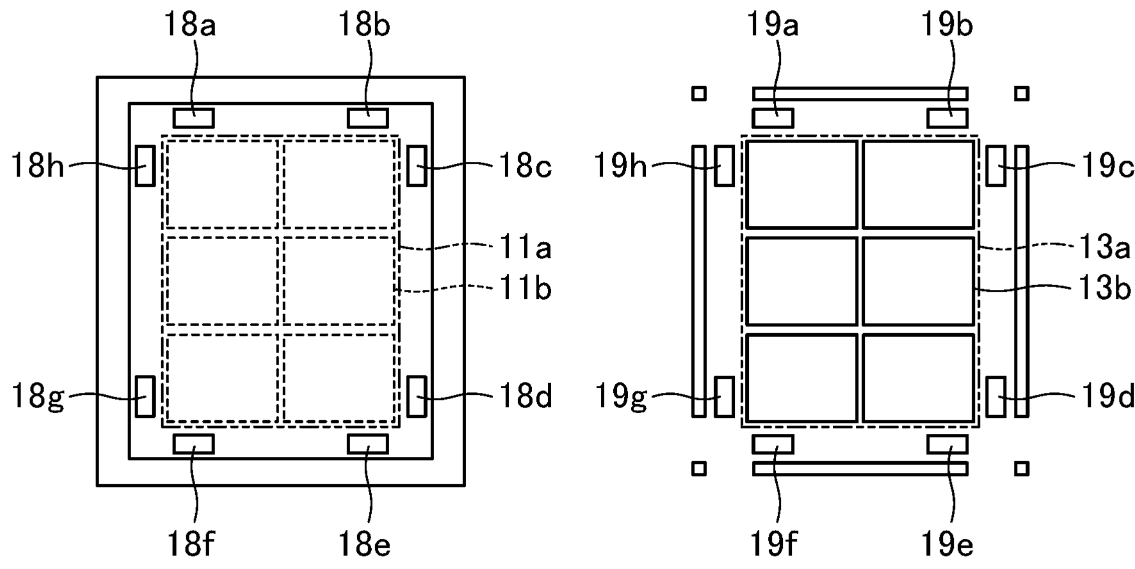
FIG. 2A
FIG. 2B
18a
18b
18h
18c
11a
11b
18g
18d
18f
18e
19a
19b
19h
19c
13a
13b
19g
19d
19f
19e
X-DIRECTION MEASUREMENT MARK
Y-DIRECTION MEASUREMENT MARK
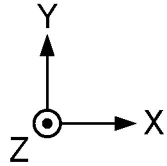
Y
X
Z FIG. 4A-1
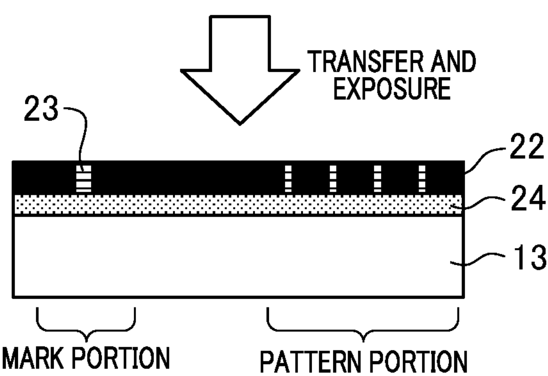
FIG. 4A-2
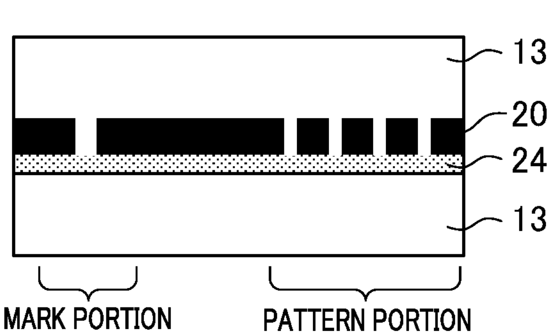
FIG. 4B
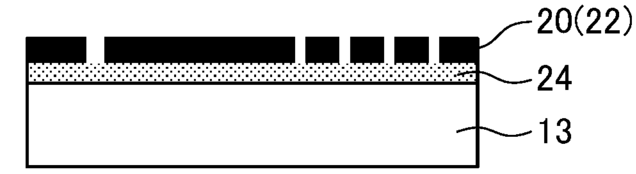
FIG. 4C
24
13
19
FIG. 4D
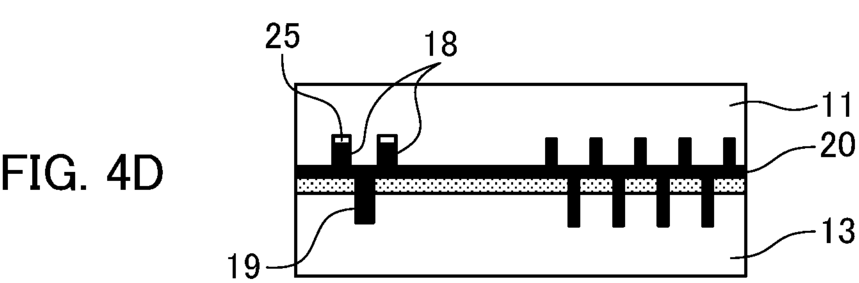

FIG. 5A
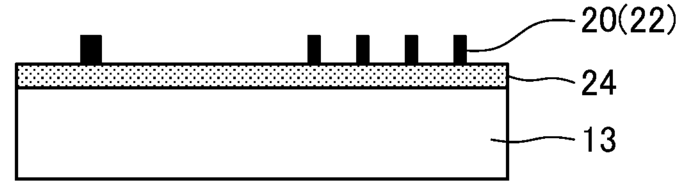
FIG. 5B
19
24
13
FIG. 5C
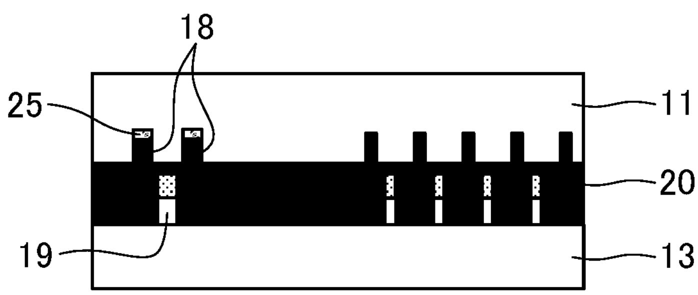

FIG. 8A
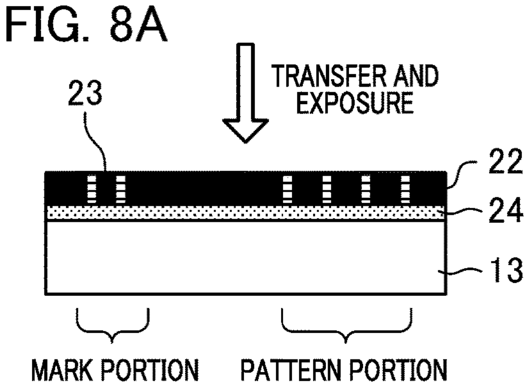
FIG. 8B
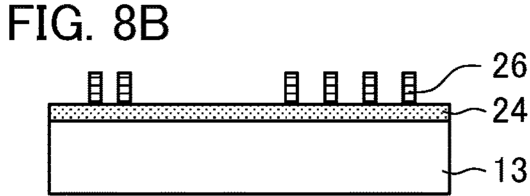
FIG. 8C
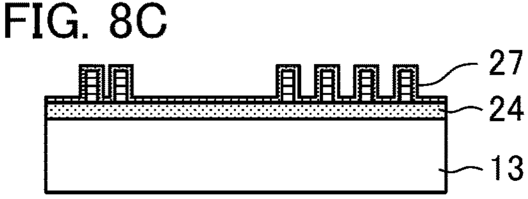
FIG. 8D
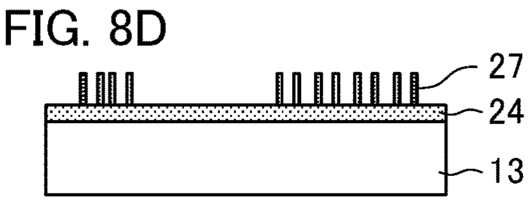
FIG. 8E
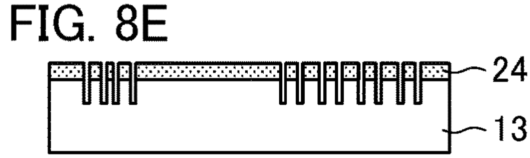
FIG. 8F
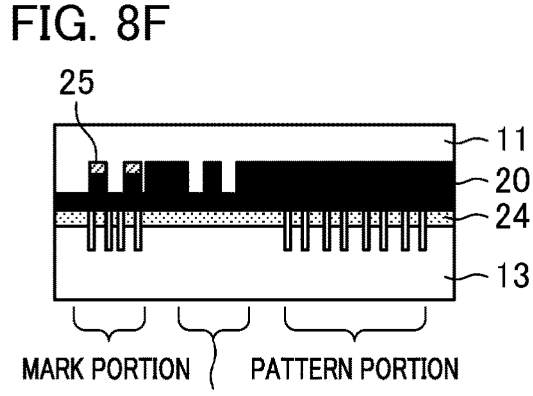
FIG. 8G
FIG. 8H
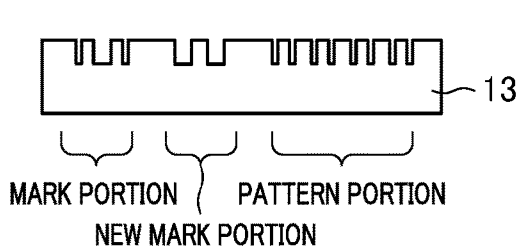

IMPRINT SYSTEM, SUBSTRATE, IMPRINT METHOD, REPLICA MOLD MANUFACTURING METHOD, AND ARTICLE MANUFACTURING METHOD

BACKGROUND OF THE INVENTION

Field of the Invention

The present invention relates to an imprint system, a substrate, an imprint method, a replica mold manufacturing method, an article manufacturing method, and the like.

Description of the Related Art

Recently, fine processing technology of impressing and transferring a fine structure on a mold onto a workpiece of a resin, a metal, or the like has been developed and has attracted attention.

This technology is called nano-imprinting, nano-embossing, or the like and has a resolution with the order of several nm, and thus has been expected to be next-generation semiconductor manufacturing technology for replacement of photolithographic equipment such as a stepper or a scanner.

Since a three-dimensional structure can be formed on a wafer in a batch using the technology, this technology has been expected to be applied to manufacturing techniques in fields other than the semiconductor field.

Such an imprint method is performed as follows when it is applied to a semiconductor manufacturing technique. That is, a photo-curing imprint material layer is formed on a substrate (for example, a semiconductor wafer). Then, a protruding/recessed portion is filled with an imprint material by impressing a mold with a desired protruding/recessed pattern formed on a processing surface onto the imprint material, and a resin is cured by applying ultraviolet light thereto.

Since the pattern is transferred to the imprint material layer in this way, etching or the like is performed using the imprint material layer as a mask layer, and formation of a pattern on a semiconductor wafer is performed.

In such an imprint technique, alignment between a mold pattern and a substrate pattern is important at the time of transfer of the protruding/recessed pattern of the mold. The alignment is performed as follows in Japanese Unexamined Patent Publication No. 2000-323461.

That is, a positioning mark is provided on a mold substrate capable of transmitting light, and a mark corresponding to the positioning mark provided on the mold substrate is also formed on a substrate. Then, the alignment between the mold and the substrate is performed using such positioning marks.

That is, the alignment between the mold and the workpiece can be performed by causing the mold substrate to transmit light from above and simultaneously observing the positioning mark provided on the mold substrate and the mark formed on the workpiece.

On the other hand, applications to manufacturing techniques in fields other than the semiconductor field have been recently studied. Examples thereof include technology of manufacturing an optical element such as a photonic crystal and a bio-chip such as a micro total analysis system (μ-TAS). In this case, for example, since a substrate material of which a difference in an optical property from the photo-curing imprint material used for imprinting is small such as glass is used, there is a problem in that it is difficult to detect the substrate-side mark.

The mold-side mark requires high durability for the purpose of repeated use, and thus even when labor and costs are incurred for formation of a material of the marks, that is all right. However, since marks have only to be observed only in the imprinting process, the substrate-side mark does not require durability and needs to be mass-produced, and thus it is necessary to simply and easily form the substrate-side marks.

It is also necessary to curb an increase in cost by removing unnecessary steps as far as possible in a series of steps.

The present invention was made in consideration of the aforementioned circumstances and an objective thereof is to provide an imprint system in which alignment performance using a substrate-side mark can be improved.

SUMMARY OF THE INVENTION

An aspect of the present invention is to provide an imprint system transferring a pattern formed on a mold to an imprint material supplied onto a substrate comprising at least one processor or circuit configured to function as: a formation unit configured to form a desired substrate-side mark including a predetermined material by applying the predetermined material onto the surface of the substrate and then transferring the substrate-side mark on the predetermined material and processing the substrate-side mark, wherein a difference in a predetermined optical property between the predetermined material and the imprint material is larger than a difference in the predetermined optical property between the imprint material and the substrate; and an alignment unit configured to align the substrate-side mark including the predetermined material and a mold-side mark provided on the mold.

Further features of the present invention will become apparent from the following description of embodiments with reference to the attached drawings.

BRIEF DESCRIPTION OF THE DRAWINGS

FIGS. 2A and 2B are diagrams illustrating an example of a configuration of an alignment mark according to the first embodiment.

FIGS. 4A-1 and 4A-2 and FIGS. 4B to 4D are diagrams illustrating a step of forming a mark portion and an imprinting step which are performed in an imprint system according to the first embodiment of the present invention.

FIGS. 5A to 5C are diagrams illustrating the mark portion forming step and the imprinting step according to the first embodiment.

FIGS. 8A to 8H are diagrams illustrating steps of preparing a replica mold according to a second embodiment of the present invention.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

In an imprint system, a pattern of a cured material to which a protruding/recessed pattern of a model (an original form) has been transferred is formed by bringing the pattern formed on the model (original form) into contact with an imprint material supplied onto a substrate and applying curing energy to the imprint material.

That is, in the imprint system, for example, a liquid imprint material is supplied onto a substrate, and the imprint material is cured, for example, by irradiating the imprint material with ultraviolet light in a state in which a mold (an original form) on which a protruding/recessed pattern is formed is in contact with the imprint material on the substrate.

By separating the mold and the substrate from each other to remove (release) the mold from the cured imprint material, the pattern of the mold can be transferred to the imprint material on the substrate. This series of processes is referred to as an "imprinting process" and is performed on each of a plurality of shot regions on the substrate.

A curable composition that is cured with application of curing energy thereto (an uncured resin which may be referred to as an imprint material) is used as the imprint material. Electromagnetic waves, heat, or the like is used as the curing energy. For example, electromagnetic waves are light such as infrared light, visible light, or ultraviolet light which is selected in a wavelength range of from 10 nm to 1 mm.

The curable composition is a composition that is cured with irradiation with light or by heating. Among these compositions, a photo-curing composition that is cured by light contains at least a polymerizable compound and a photopolymerization initiator and may further contain a non-polymerizable compound or a solvent according to necessity.

The non-polymerizable compound is at least one kind selected from a group consisting of a sensitizer, a hydrogen donor, an internally added mold releasing agent, a surfactant, an antioxidant, and polymer components. The imprint material is applied in the form of a film onto a substrate using a spin coater or a slit coater.

Alternatively, the imprint material may be applied in the form of a droplet or an island or a film form in which a plurality of droplets are connected onto a substrate by a liquid spray head. The viscosity of the imprint material (viscosity at 25° C.) is, for example, equal to or greater than 1 mPa·s and equal to or less than 100 mPa·s.

First Embodiment

Figure 1:
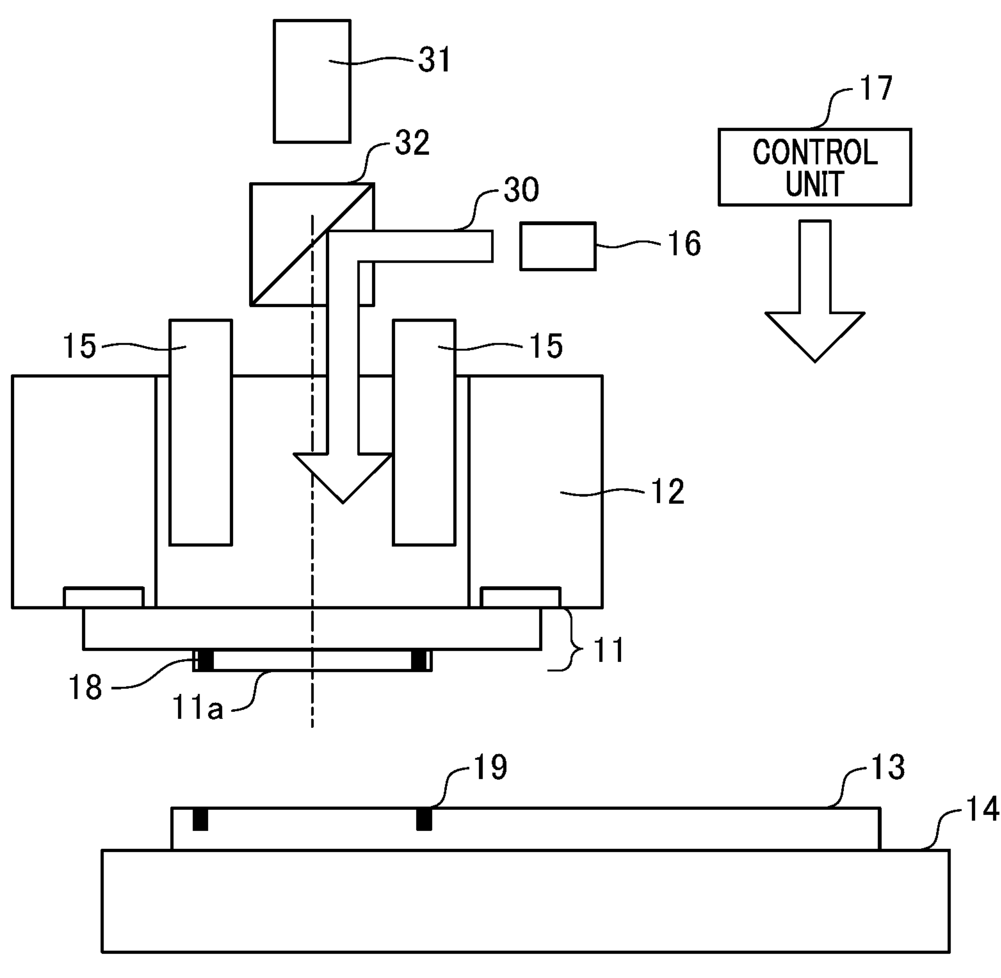
FIG. 1 is a diagram schematically illustrating an example of a configuration of an imprint device 1 according to a first embodiment of the present invention.
Figure 1:
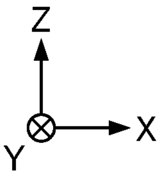

FIG. 1 is a diagram schematically illustrating an example of a configuration of an imprint device 1 according to a first embodiment. The imprint device 1 shapes and cures an imprint material (not illustrated) supplied onto a substrate 13 using a mold (an original form) 11 including a pattern region in which a protruding/recessed pattern is formed. The imprint device 1 performs an imprinting process of forming a pattern on a substrate by separating (removing or releasing) the mold from the cured imprint material.

In the imprint device 1, a space in which the imprinting process is performed is referred to as a processing section. In the present embodiment, a resin is used as the imprint material, and a photo-curing method of curing the resin with irradiation with ultraviolet light is employed as a resin curing method.

The imprint device 1 includes a mold holding unit 12 that holds a mold 11, a substrate holding unit 14 that holds a substrate 13, a detection unit 15, an irradiation unit 16, and a control unit 17. The control unit includes a CPU which is a computer and a memory which is a storage medium, and controls the imprinting process or the like using the imprint device by causing the CPU to execute a computer program stored in the memory.

The imprint device may further include a supply unit including a dispenser that supplies an ultraviolet-curing imprint material onto a substrate and a shape deforming mechanism that deforms a pattern region 11*a* of a mold 11 by applying a force to the side surface of the mold 11. The imprint device 1 may further include a bridge table that supports the mold holding unit 12 and a base table that supports the substrate holding unit 14. The imprint device 1 may further include a storage unit in which a plurality of molds 11 are stored.

The mold 11 includes a pattern region 11*a* in which a pattern (a protruding/recessed pattern) to be transferred to (an imprint material on) the substrate 13 is formed. The mold 11 is formed of a material transmitting ultraviolet light for curing the imprint material on the substrate 13, for example, quartz. An alignment mark (a mold-side mark 18) that is used for control alignment between the mold 11 and the substrate 13 is formed in the pattern region 11*a* of the mold 11.

The mold holding unit 12 is a holding mechanism that holds the mold 11. The mold holding unit 12 includes, for example, a mold chuck that chucks the mold 11 in a vacuum or in an electrostatic manner, a mold stage on which the mold chuck is placed, and a drive system that drives (moves) the mold stage.

The drive system drives the mold stage (that is, the mold 11) in at least a Z-axis direction (an impressing direction in which the mold 11 is impressed on the imprint material on the substrate 13). The drive system may have a function of driving the mold stage in an X-axis direction, a Y-axis direction, and a θ direction(a rotating direction around the Z axis) in addition to the Z-axis direction.

The substrate 13 is a substrate to which the pattern of the mold 11 is transferred (that is, a substrate on which a pattern formed of the imprint material is formed). For example, glass, ceramics, metal, semiconductor, or resin can be used as the material of the substrate 13.

The imprint material is supplied (applied) onto the substrate 13 from a supply unit which is not illustrated. An alignment mark that is used for controlling alignment between the mold 11 and the substrate 13 (a substrate-side mark 19) is formed on the substrate 13.

The substrate holding unit 14 is a holding mechanism that holds the substrate 13. The substrate holding unit 14 includes, for example, a substrate chuck that chucks the substrate 13 in vacuum or in an electrostatic manner, a substrate stage on which the substrate chuck is placed, and a drive system that drives the substrate stage.

The drive system drives the substrate stage (that is, the substrate 13) in at least the X-axis direction and the Y-axis direction (directions perpendicular to the Z-axis direction which is an impressing direction of the mold 11). The drive system may have a function of driving the substrate stage in the Z-axis direction and the θ direction (the rotating direction around the Z axis) in addition to the X-axis direction and the Y-axis direction.

The drive system of the substrate holding unit 14 functions as an alignment unit configured to align a substrate-side mark 19 and a mold-side mark 18.

The detection unit 15 can detect a position of an alignment mark (the substrate-side mark 19) provided on the substrate 13. In the present embodiment, the detection unit 15 includes a scope that optically observes the substrate-side mark 19 and the mold-side mark 18 via the mold 11, and detects a relative position between the mold-side mark 18 and the substrate-side mark 19 corresponding thereto.

For example, the detection unit 15 measures the relative position between the mold-side mark 18 and the substrate-side mark 19 corresponding thereto using the scope and calculates the relative position between the mold 11 (the pattern region 11*a*) and the substrate 13 (a shot region) based on the result of measurement.

The detection unit 15 may include a scope including an optical system that simultaneously images two marks or may include a scope that detects a signal in which a relative positional relationship between the two marks is reflected such as an interference signal or a moire signal.

The detection unit 15 may not be able to simultaneously detect the mold-side mark 18 and the substrate-side mark 19. For example, the detection unit 15 may detect the relative positional relationship between the mold-side mark 18 and the substrate-side mark 19 by calculating the positions of the mold-side mark 18 and the substrate-side mark 19 relative to a reference position disposed therein.

The irradiation unit 16 cures the imprint material by irradiating the imprint material on the substrate with light 30 for curing the imprint material (for example, ultraviolet light) via the mold 11. The irradiation unit 16 may include, for example, a light source emitting the light 30 for curing the imprint material and an optical system adjusting the light 30 emitted from the light source to be light optimal for an imprinting process.

In the imprint device 1 according to the present embodiment, the light 30 emitted from the irradiation unit 16 is reflected by a beam splitter 32 and is applied to the substrate 13 (specifically, the imprint material on the substrate).

The observation unit 31 includes, for example, a camera with a field of view including the whole pattern region 11*a* of the mold 11 and has a function of observing (ascertaining) a cured state of the imprint material on the substrate due to irradiation with ultraviolet light.

In the imprint device 1 according to the present embodiment, the observation unit 31 observes the cured state of the imprint material on the substrate via the beam splitter 32. The observation unit 31 can also observe an impressed state of the mold 11 onto the imprint material on the substrate, a filled state of the pattern of the mold 11 with the imprint material, and a released state of the mold 11 from the cured imprint material on the substrate.

FIGS. 2A and 2B are diagrams illustrating an example of a configuration of an alignment mark according to the first embodiment, where the mold-side mark 18 and the substrate-side mark 19 are illustrated. In the example illustrated in FIGS. 2A and 2B, six chip regions are disposed in one shot region of the substrate 13.

FIG. 2A is a diagram illustrating an example of arrangement of mold-side marks 18*a* to 18*h* which are formed at four corners outside of the pattern region 11*a* (all six rectangular regions surrounded with dotted lines) of the mold 11. In FIG. 2A, the mold-side marks 18*a*, 18*b*, 18*e*, and 18*f* having a longitudinal direction parallel to the X-axis direction are marks for measuring a position in the X-axis direction.

The mold-side marks 18*c*, 18*d*, 18*g*, and 18*h* having a longitudinal direction parallel to the Y-axis direction are marks for measuring a position in the Y-axis direction. In FIG. 2A, the six rectangular regions 11*b* surrounded with the dotted lines indicate the pattern region 11*a* to be transferred to six chip regions 13*b* on the substrate.

FIG. 2B is a diagram illustrating substrate-side marks 19*a* to 19*h* which are formed at four corners outside of one shot region 13*a* (all six rectangular regions surrounded with solid lines) on the substrate 13. In FIG. 2B, the substrate-side marks 19*a*, 19*b*, 19*e*, and 19*f* having a longitudinal direction parallel to the X-axis direction are marks for measuring a position in the X-axis direction.

The substrate-side marks 19*c*, 19*d*, 19*g*, and 19*h* having a longitudinal direction parallel to the Y-axis direction are marks for measuring a position in the Y-axis direction. In FIG. 2B, the six regions surrounded with the solid lines constituting the shot region 13*a* indicate chip regions 13*b*. Each chip region 13*b* is, for example, a region from which one semiconductor chip having an integrated circuit formed thereon is obtained.

In the imprinting process, when the mold 11 is brought into contact with the imprint material on the substrate, the mold-side marks 18*a* to 18*h* provided on the mold 11 and the substrate-side marks 19*a* to 19*h* provided on the substrate 13 approach each other.

Accordingly, by detecting the mold-side marks 18 and the substrate-side marks 19 using the detection unit 15, it is possible to compare the position and shape of the pattern region 11*a* of the mold 11 with the position and shape of the shot region 13*a* of the substrate 13.

When there is a difference (offset) between the position and shape of the pattern region 11*a* of the mold 11 and the position and shape of the shot region 13*a* on the substrate 13, overlap accuracy is decreased and pattern transfer failure (a product defect) is caused.

Figure 3A:
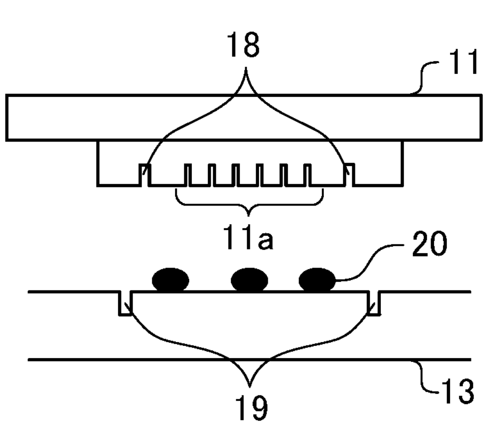
FIGS. 3A to 3C are diagrams illustrating an imprinting process according to the first embodiment.
Figure 3B:
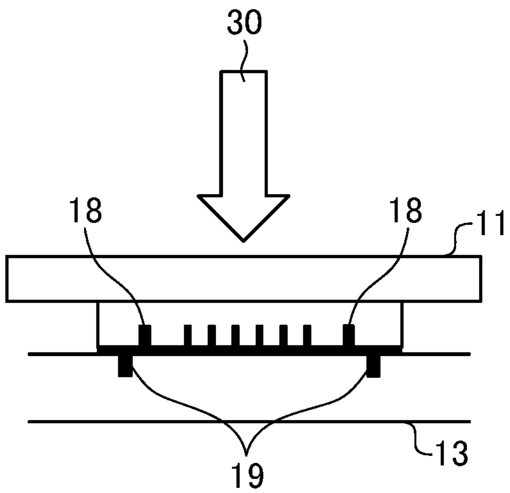
Figure 3C:
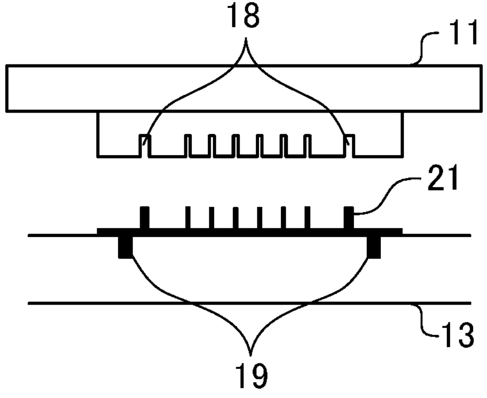

FIGS. 3A to 3C are diagrams illustrating the imprinting process according to the first embodiment. The imprinting process of transferring a pattern of the mold 11 onto the imprint material on the substrate 13 and shaping the imprint material will be described below with reference to FIGS. 3A to 3C.

As illustrated in FIG. 3A, before impression of the mold 11 is started, the imprint material 20 is supplied to a target shot region on the substrate (a shot region on which the imprinting process is performed from now on). The imprint material which is generally used in the imprint device has high volatility and thus is supplied to the substrate immediately before the imprinting process is performed. When the imprint material has low volatility, the imprint material may be supplied to the substrate using a spin coater or the like in advance.

The substrate 13 is moved to the bottom of the mold 11 after the imprint material 20 has been supplied onto the substrate. Then, the relative position between the mold-side marks 18 and the substrate-side marks 19 is detected by the detection unit 15, and alignment of the mold 11 and the substrate 13 and shape correction of the mold 11 are controlled in a state in which the mold is in contact with the imprint material based on the result of detection.

Then, as illustrated in FIG. 3B, the mold 11 is brought into contact with the imprint material 20 on the substrate, and a predetermined time is made to elapse in that state to fill the pattern (the protruding/recessed structure) of the mold 11 with the imprint material 20.

In the meanwhile, the mold-side marks 18 and the substrate-side marks 19 are detected by the detection unit 15, and alignment of the mold 11 and the substrate 13 is controlled based on the result of detection.

When the pattern of the mold 11 is filled with the imprint material 20 (that is, when the predetermined time elapses), the imprint material 20 is cured by causing the irradiation unit 16 to irradiate the imprint material 20 on the substrate with light 30.

Then, as illustrated in FIG. 3C, the mold 11 is separated (released) from the cured imprint material 20 on the substrate. Accordingly, it is possible to form a pattern 21 formed of the imprint material 20 on the substrate. That is, it is possible to transfer the pattern of the mold 11 onto the substrate.

In FIG. 3B, when a difference in an optical property between the mold 11 and the imprint material 20 is small and the mold-side marks 18 include only a protruding-recessed structure, it may be difficult to detect the mold-side marks 18 using the detection unit 15.

Accordingly, it is preferable that the mold-side marks 18 be formed of a material having an optical property (a refractive index or an extinction coefficient) different from that of the mold 11 or that the refractive index of the region of the mold-side marks 18 be changed by ion irradiation or the like. Accordingly, the mold-side marks 18 can be detected by the detection unit 15 even in a state in which the mold 11 and the imprint material 20 on the substrate are in contact with each other.

However, nano-imprint lithography (NIL) may be used to manufacture an optical element for providing an optical function. In this case, the imprinting process is performed using a substrate of which an optical property is close to that of the imprint material or a substrate of which a difference in an optical property from the atmospheric gas is not large such as glass.

In this case, it is difficult to recognize marks formed on the substrate at the time of application of a liquid or at the time of observation before application of a liquid. Since a large number of substrates are processed at the time of mass production unlike the mold, it is necessary to employ a simple and cheap technique. On the other hand, since the marks can be seen only at the time of transfer of a pattern in the NIL, durability is not required. In consideration of these, substrate-side marks which can be easily observed are formed as follows in the present embodiment.

FIGS. 4A-1 and 4A-2 and FIGS. 4B to 4D are diagrams illustrating a step of forming mark portions and an imprinting step which are performed in the imprint system according to the first embodiment of the present invention.

FIG. 4A-1 is a diagram illustrating an example in which a pattern or a mark is formed on a substrate used for imprinting using photolithographic equipment, and FIG. 4A-2 is a diagram illustrating an example in which a pattern or a mark is formed on a substrate used for imprinting using NIL. In any case, a desired substrate-side mark is transferred after a predetermined material 24 is formed on the surface of the substrate.

In FIG. 4A-1, a lithographic resist 22 is applied on a substrate 13, and a pattern of a reticle is transferred and exposed using ultraviolet light. Although there is a difference between negative and positive according to resist characteristics, an exposed portion 23 is assumed to be a region to be etched in FIG. 4A-1. In this case, the material 24 can be formed between the resist and the substrate by forming the material 24 on the substrate 13 in advance and then applying the resist 22 thereto.

A material of which an optical property is different by a predetermined value from that of the substrate or the imprint material is used as the material 24. Here, a difference in a predetermined optical property between the material 24 and the imprint material 22 is larger than a difference in the predetermined optical property between the imprint material 22 and the substrate 13. The predetermined optical property is a refractive index or an extinction coefficient.

On the other hand, in FIG. 4A-2, the material 24 is formed on the substrate 13 in advance, and a pattern of a mold is transferred thereto using an NIL process illustrated in FIG. 3.

A state in which they are developed or the mold is released is illustrated in FIG. 4B. A result of processing using the imprint material 20 or the resist 22 as an etching mask and using an etching process as a processing step is illustrated in FIG. 4C.

In this way, the processes illustrated in FIG. 4A-1 or 4A-2 and FIGS. 4B and 4C function as a formation step of forming a substrate-side mark including the predetermined material 24 by forming the predetermined material 24 on the surface of the substrate and then transferring and processing a desired substrate-side mark. A process device serving as a formation unit performing the formation step is provided in the imprint system.

As illustrated in FIG. 4C, the material 24 is etched according to the transferred pattern. Accordingly, when the etched portion is optically observed from above the substrate 13, a signal intensity difference is generated due to a reflectance difference between a portion with the material 24 and a portion without the material 24, and thus the etched portions can be detected as a mark.

In a mark detection method using refraction, since refracted light is produced by forming a constant optical path difference (a phase difference), the refractive index or the thickness of the material 24 may be changed such that a desired optical path difference is acquired. The physical property of an optimal material varies according to the mark detecting method and thus is predicted appropriately using simulation or the like.

In FIG. 4D, a state in which imprinting is performed after the imprint material has been supplied to the substrate formed in the steps of FIG. 4C as in FIG. 3B is illustrated. The protruding/recessed portions of the substrate 13 and the mold 11 are filled with the imprint material 20 by impression.

It is preferable that a mold mark material 25 of which an optical property is different by a predetermined value or the more from that of the imprint material or the mold material be formed in the recessed portions of the mold-side mark 18 such that the marks of the mold can be detected even in this state.

In the state illustrated in FIG. 4D, the relative position between the mold-side mark 18 and the substrate-side mark 19 including the material 24 (in which a part of the material 24 remains) is measured by the detection unit 15, and an alignment step is performed thereon. A shift, a rotation, a magnification, deformation of a shot shape, and the like are calculated based on the acquired differences between the marks, and correction is performed thereon using correction mechanisms.

FIGS. 5A to 5C are diagrams illustrating the step of forming a mark portion and the imprinting step according to the first embodiment, where a step of processing a substrate pattern when an unremoved material is inverted is illustrated.

FIG. 5A is equivalent in processing step to FIG. 4B and illustrates a developed state after transferring has been performed using lithography or a state in which transferring has been performed using the NIL. FIG. 5B is a diagram illustrating a result of an etching step using the imprint material 20 or the resist 22 as an etching mask.

FIG. 5C is a diagram illustrating a state in which the imprint step has been performed on the substrate illustrated in FIG. 5B. Since the material 24 remains in protruding portions of the substrate-side marks, it is possible to acquire a detection signal with a high contrast due to a difference in the optical property between the portion with the material 24 remaining and the portion without the material 24 similarly to FIG. 4D.

It is preferable that the material 24 have an optical property with which a signal can be acquired when the alignment marks are observed as described above. Specifically, when measurement is performed at the time of imprinting, it is preferable that the difference in the optical property (the refractive index or the extinction coefficient) from the imprint material be equal to or greater than a predetermined value.

When the difference in the optical property between the atmospheric gas and the substrate is not large even before a liquid is applied to the imprint material, the contrast of the detection signal is weakened. However, when the substrate-side alignment marks formed using the method according to the present embodiment are used, it is possible to stably acquire a detection signal with a higher contrast.

When the material 24 is removed after the etching step using the transferred pattern in this step has been performed, the material is preferably a material which can be easily released. For example, a resin which can be easily released by washing may be used as the material 24. When the material is used for a device manufacturing step, it is preferably a material suitable therefor. For example, a metal such as Cu or Co may be used as the material 24 such that it is used for a wiring step.

Figure 6A:
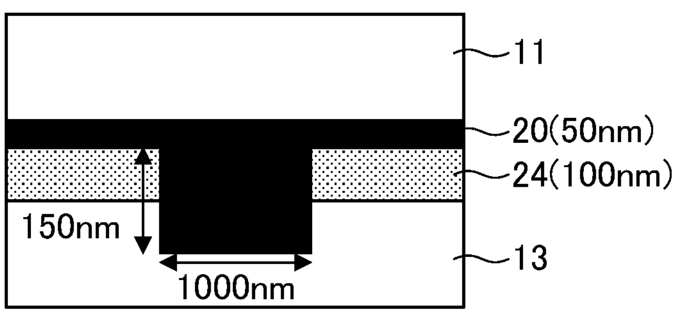
FIGS. 6A to 6C are diagrams illustrating an example in which optical simulation is used for optical properties required for a material 24.
Figure 6B:
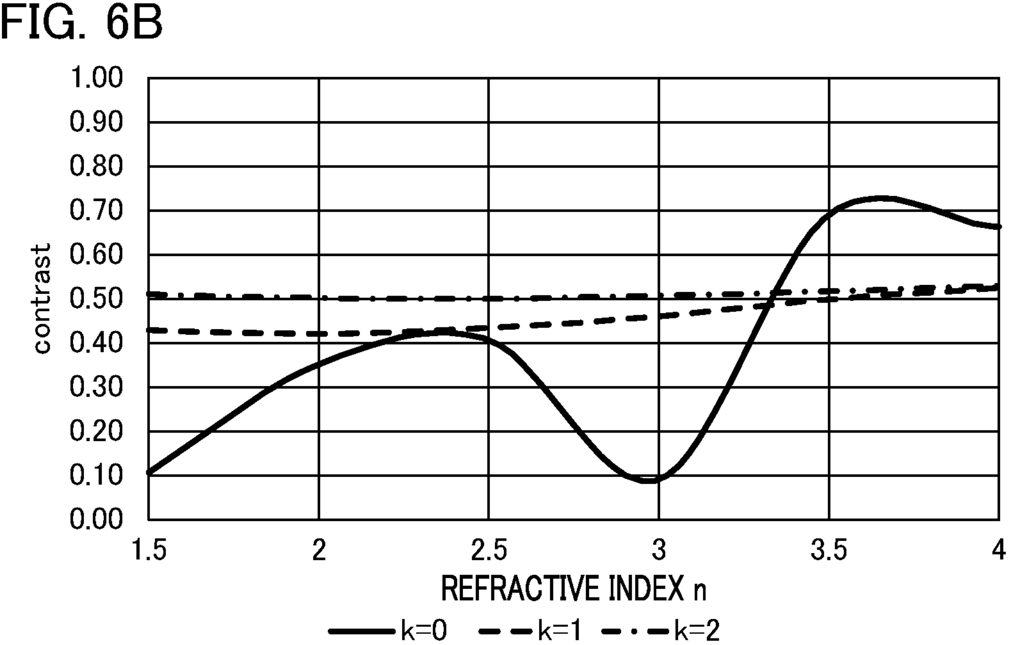
Figure 6C:
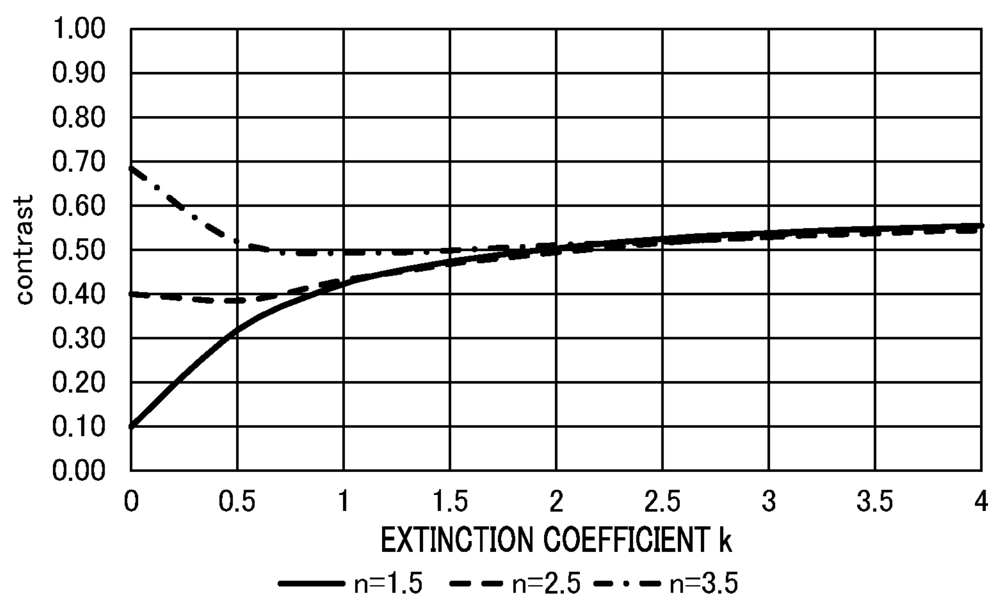
Figure 7A:
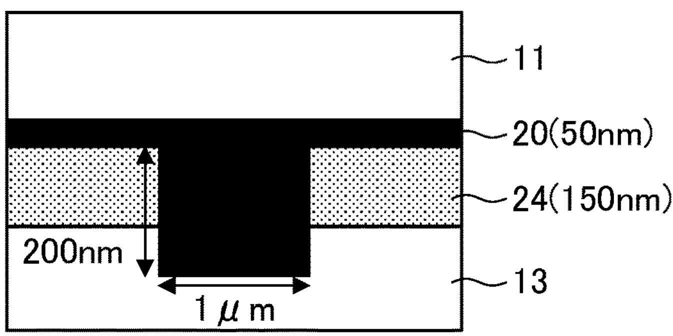
FIGS. 7A to 7C are diagrams illustrating an example in which optical simulation is used when a thickness of the material 24 or a depth of a recessed structure in FIGS. 6A to 6C is changed.
Figure 7B:
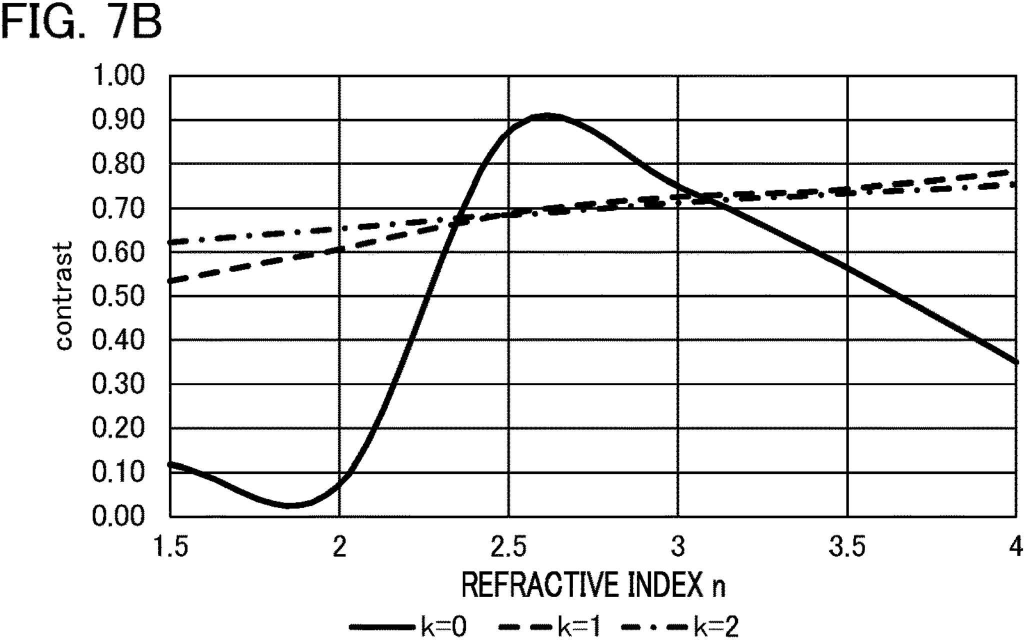
Figure 7C:
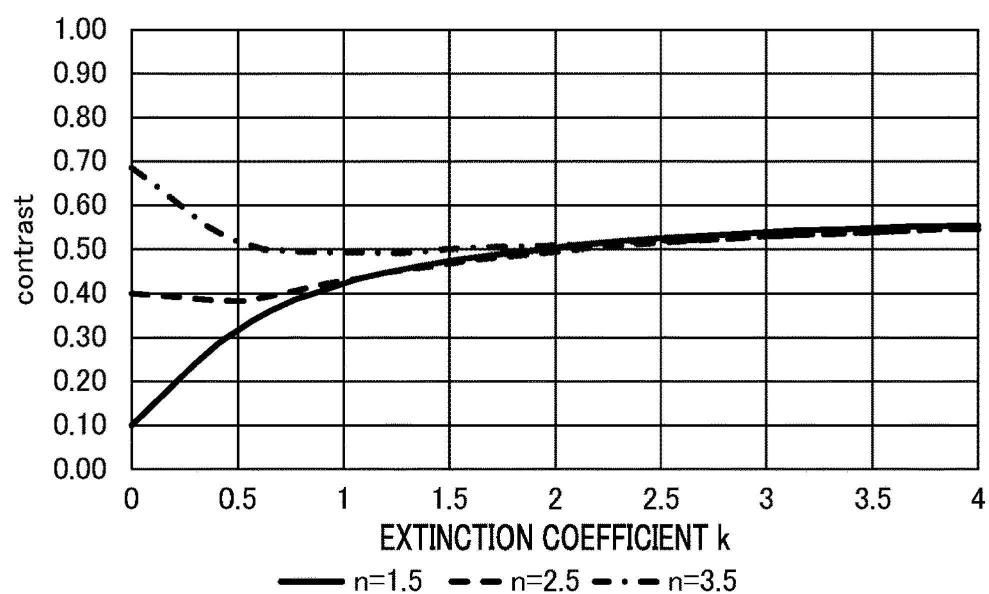

FIGS. 6A to 6C are diagrams illustrating an example in which optical simulation is used to calculate an optical property required for the material 24. FIGS. 7A to 7C are diagrams illustrating an example in which optical simulation when the thickness of the material 24 or the depth of the recessed structure in FIG. 6 has changed is used.

FIG. 6A is a diagram illustrating a model with a sectional structure at the time of imprinting. A material 24 is formed on a substrate 13 formed of glass, and a recessed structure with a width of 1000 nm and a depth of 150 nm is formed by etching.

Thereafter, an imprint material 20 is applied and is imprinted using a mold 11. In this case, the material 24 has a thickness of 100 nm and the imprint material 20 has a thickness of 50 nm. On the other hand, FIG. 7A illustrates a model when the same structure as in FIG. 6A is provided and the thickness of the material 24 is set to 150 nm.

Results of optical simulation in which the refractive index n and the extinction coefficient k which are the optical properties of the material 24 in FIG. 6A are changed are illustrated in FIGS. 6B and 6C, and results of optical simulation performed on the model illustrated in FIG. 7A are illustrated in FIGS. 7B and 7C. The contrast of the vertical axis represents a value obtained by calculating "(maximum−minimum)/(maximum+minimum)" of a signal intensity obtained by simulation.

Referring to FIGS. 6B and 7B, it can be seen that the contrast changes greatly with change of the refractive index n when the extinction coefficient k is zero. It can also be seen that the change of the contrast with respect to the refractive index varies by comparing FIG. 6B and FIG. 7B at that time.

As a result, it can be thought that optical interference in the material 24 affects the contrast when the extinction coefficient k is zero. On the other hand, when the extinction coefficient increases, a high contrast is stably exhibited. It is thought that this is because light transmissivity of the material 24 decreases and an influence of the optical interference decreases.

As a result, it is possible to calculate the refractive index n, the extinction coefficient k, and the film thickness, and the like which are suitable for conditions of the material 24 for obtaining the contrast required for achieving necessary measurement accuracy. For example, in the configuration illustrated in FIG. 6A, when it is intended to obtain a high contrast equal to or higher than 0.5, a refractive index of 3.5 or more and an extinction coefficient of 0 to 2 or an extinction coefficient of 2 to 4 and a refractive index of 1.5 to 3.5 can be selected from the ranges calculated in FIGS. 6B and 6C.

In the configuration illustrated in FIG. 7A, when it is intended to obtain a high contrast equal to or higher than 0.5, a refractive index of 2.3 to 3.6 or more and an extinction coefficient of 0 to 2 or an extinction coefficient of 2 to 4 and a refractive index of 1.5 to 3.5 can be selected from the ranges calculated in FIGS. 7B and 7C.

Since the conditions required for the material 24 includes optical interference conditions based on the film thickness or structure of the substrate or the mold, a stacked structure of different materials formed on the substrate side, and the like, it is preferable that they be sequentially ascertained through simulation or actual evaluation.

Since the material 24 is used to form the substrate-side marks, the material 24 is removed after etching using the transferring pattern has been performed by performing the step illustrated in FIG. 4D. That is, a removal step of removing the material 24 formed on the substrate is performed after the pattern of the mold has been transferred to the imprint material.

The imprint system includes processing equipment which is a removal unit configured to perform the removal step. When the material can be used in a series of device manufacturing step, the material 24 may be left and used without being removed.

As described above, with the substrate-side mark forming method according to the first embodiment, it is possible to simply and cheaply form substrate-side marks which can be easily detected at the time of imprinting on a substrate of which a difference in an optical property from the imprint material is small.

When the substrate-side alignment marks formed in the present embodiment are used, it is possible to stably acquire a detection signal with a higher contrast. Accordingly, it is possible to perform alignment with high accuracy and to improve reliability of products which are manufactured by imprinting.

In general, when the substrate is formed of glass, irradiation light is not much absorbed and thus it is difficult to correct a shape of the substrate by generating heat through local irradiation with light. However, according to the present embodiment, since the irradiation light with which the substrate is locally irradiated is absorbed by the material 24 to generate heat by using a material with high light absorbance for the material 24, it is possible to correct a shot shape by locally irradiating a part of the substrate with light.

Second Embodiment

A method of manufacturing a nano-imprinting mold using the first embodiment will be described below as a second embodiment. With the nano-imprinting mold, an (ultraviolet-curing) imprint material is cured by irradiation with ultraviolet light after a liquid has been applied and the pattern of the mold has been filled with an imprint material. Accordingly, the mold is preferably formed of a material transmitting ultraviolet light and, for example, quartz is used.

As the mold pattern, a mold in which a pattern has been drawn using an electron beam (EB) drawing device (a so-called master mold) may be formed to decrease a cost thereof. Then, the pattern is transferred by imprinting the mold onto another mold substrate, and the mold is etched and used as an imprinting mold (a so-called replica mold).

Recently, miniaturization of a pattern for a device has progressed, and patterns which cannot be drawn using the EB have been used. A mask pattern is reduced and projected in lithography, but since transferring with a 1:1 size is performed in nano-imprinting, a necessary fine pattern needs to be formed on an NIL mask.

Accordingly, a narrower line width is realized by performing a processing step such as self-aligned double patterning (SADP) or self-aligned quadruple patterning (SAQP) on a pattern transferred onto a mold substrate.

However, when this step is applied to a nano-imprinting mold, alignment marks are narrowed to an actual device level and thus it is difficult to detect the alignment marks. Even if it is intended to form recessed portions out of a mold-side mark of different materials in order to visualize the mold-side mark at the time of application of a liquid, it is difficult to form the recessed portions of the mold-side mark out of different materials when the width of the recessed portions is small and a very thin film is formed. Accordingly, it is difficult to obtain a detection signal.

When a device pattern is formed through the processing step such as SADP or SAQP and then alignment marks are formed, it is necessary to align the relative position to the device pattern portion with high accuracy.

Accordingly, it is necessary to form marks with high detection accuracy, but marks of a quartz substrate or the like are not easily observed at the time of imprinting. As a result, it is possible to increase the contrast of the alignment marks by applying the method according to the first embodiment to a case in which the substrate is formed of quartz.

FIGS. 8A to 8H are diagrams illustrating steps of forming a replica mold according to the second embodiment of the present invention. An example of a method of manufacturing a replica mold according to the second embodiment will be described below with reference to FIGS. 8A to 8H.

FIG. 8A illustrates a state in which a device pattern is transferred onto a mold substrate 13 for a replica mold (a replica mold substrate), and FIG. 8B illustrates a state in which the pattern is developed. Here, a reticle pattern is transferred and exposed through lithography, but a desired pattern may be transferred through nano-imprinting. In this case, the transferred pattern has the same shape as illustrated in FIG. 8B.

Here, the steps illustrated in FIGS. 8A and 8B serve as a formation step of forming a substrate-side mark. In the formation step, after the material 24 has been applied to the surface of the replica mold substrate, a first pattern and the substrate-side marks are transferred onto the replica mold substrate and the resultant structure including the material 24 is processed. Accordingly, the first pattern including the material 24 and the substrate-side marks including the material 24 are formed on the replica mold substrate.

In FIG. 8C, since SADP is performed on the transferred pattern (the first pattern), a thin film 27 is formed on the top surface. Thereafter, by removing the pattern formed in FIG. 8B, only the thin film 27 can be left as illustrated in FIG. 8D.

By performing etching using the resultant structure as a mask, it is possible to form a pattern with a pattern finer and higher in density than an initially transferred pattern. By repeating the same steps once more, it is possible to form a finer pattern with a higher density (an SAQP step).

When this step is also performed on the mark portions, alignment marks with a fine structure can be formed and thus a line width enough to acquire an alignment signal cannot be secured. Therefore, in the second embodiment, alignment marks (new mark portions) are separately formed after this step.

In FIG. 8E, a result of etching which is performed by inverting the pattern and using the inverted pattern as a mask is illustrated. Protruding/recessed portions of the pattern vary according to transfer conditions, but protruding/recessed portions can be inverted by transferring a pattern, then applying an inversion film thereto, and removing the transferred pattern.

FIG. 8F illustrates an imprinting step of imprinting the alignment marks (new mark portions) on the substrate formed in FIG. 8E. A supply step of supplying an imprint material to the replica mold substrate is performed before the step illustrated in FIG. 8F.

In the step illustrated in FIG. 8F, a stepped portion is formed in the mold 11 such that the imprint material is thickened to protect the patterned portions formed in the previous step using the imprint material in a next etching step.

The mark portions of the mold substrate 13 for a replica mold have a fine structure but include the material 24, and thus the mark portions can be observed with a high contrast. Accordingly, it is possible to align the substrate-side marks and the mold-side marks.

Then, the marks (new mark portions) which are used when the mold substrate 13 for a replica mold is used as a mold and a layer of the imprint material for protecting the pattern portions formed in the previous step in the next etching step are transferred to the imprint material 20 on the replica mold substrate.

A material 25 may be formed in advance in the recessed portions of the mold-side marks in order to easily detect the mold-side marks at the time of impression.

A state in which etching has been performed using the imprint material transferred as described above as a mask is illustrated in FIG. 8G, and a state in which the material 24 has been finally removed is illustrated in FIG. 8H.

When the second embodiment is not applied, alignment accuracy of the mark portions decreases greatly. Accordingly, a difference in the relative position between the new mark portions on the mold substrate 13 side for the replica mold and the pattern portions increases much, and a large alignment offset is required at the time of imprinting using the replica mold.

In nano-imprinting, a so-called die-by-die alignment method of measuring the relative position of the mold-side marks and the substrate-side marks for each shot is employed. Accordingly, when there is a large offset, mixture of noise light from a neighboring pattern or the like occurs.

Therefore, it is possible to reduce an offset to an offset value in an allowable range by using the method according to the second embodiment. In the replica mold formed using the method according to the second embodiment, an offset between the mark portions and the pattern portions may occur. In this case, an offset value can be calculated by additionally measuring the relative position or performing actual imprinting, and alignment can be performed in consideration of the offset value.

According to the second embodiment, it is possible to form an imprinting mold in which both fine pattern portions and new mark portions with a line width required for acquiring an alignment signal are compatible through the aforementioned steps.

(Embodiment of Article Manufacturing Method)

By using the imprint system and the imprint method according to the present embodiment, for example, it is possible to improve productivity or quality when manufacturing an article such as a micro device such as a semiconductor device or an element with a fine structure.

A method of manufacturing a device (such as a semiconductor device, a magnetic storage medium, or a liquid crystal display device) which is an article will be described below. Such a manufacturing method may include a pattern forming step of forming a pattern of a mold (an original form) on the surface of a substrate (such as a wafer, a glass plate, or a film-shaped substrate) using lithographic equipment.

The step of transferring a pattern of a mold may include a pattern forming step of forming a flat pattern. The substrate is not limited to a single base and may include a substrate with a multi-layered structure. Alternatively, the pattern transferring step may include a pattern forming step of transferring a pattern to a photosensitive member on the substrate through exposure using lithographic equipment.

This manufacturing method further includes a step of processing the substrate before or after the pattern forming step. For example, the step of processing the substrate may include a step of removing a residual film of the pattern or a developing step.

This manufacturing method further includes a processing step such as a step of etching the substrate on the substrate on which the pattern has been formed in the pattern forming step, for example, using the pattern as a mask. The processing step may include a step (dicing) of cutting out chips from the substrate, a step (bonding) of disposing a chip on a frame and electrically connecting them, or a step (molding) of sealing the substrate with a resin.

With the article manufacturing method using the imprint device according to the present embodiment or the like, since alignment accuracy can be secured more stably in comparison with in the related art, the method is advantageous in at least one of performance, quality, productivity, and production cost of an article.

While the present invention has been described in detail in conjunction with exemplary embodiments thereof, the present invention is not limited to the embodiments and can be modified in various forms based on the gist of the present invention. It is not intended to exclude the modifications from the scope of the present invention.

This application claims the benefit of Japanese Patent Application No. 2022-103246, filed on Jun. 28, 2022, which is hereby incorporated by reference herein in its entirety.

What is claimed is:

1. An imprint system that transfers a pattern formed on a mold to an imprint material supplied onto a glass substrate, the imprint system comprising at least one processor or circuit configured to control:

a formation unit configured to form a desired substrate-side mark using a predetermined material different from the imprint material by applying the predetermined material onto a surface of the glass substrate, applying the imprint material on top of the predetermined material, transferring the substrate-side mark to the predetermined material by etching the imprint material and the predetermined material, and processing the substrate-side mark, wherein a difference in a predetermined optical property between the predetermined material and the imprint material is larger than a difference in the predetermined optical property between the imprint material and the glass substrate; and an alignment unit configured to align the substrate-side mark including the predetermined material and a mold-side mark provided on the mold.

2. The imprint system according to claim 1, wherein the alignment is performed in a state in which the mold is in contact with the imprint material.

3. The imprint system according to claim 1, wherein the at least one processor or circuit is configured to control:

a removal unit configured to remove the predetermined material formed on the substrate after the pattern of the mold has been transferred onto the imprint material.

4. The imprint system according to claim 1, wherein the predetermined optical property includes a refractive index or an extinction coefficient.

5. A method of imprinting having an imprinting process of transferring a pattern formed on a mold to an imprint material supplied onto a glass substrate, the method comprising:

forming a desired substrate-side mark using a predetermined material different from the imprint material by applying the predetermined material onto a surface of the glass substrate, applying the imprint material on top of the predetermined material, transferring the substrate-side mark to the predetermined material by etching the imprint material and the predetermined material, and processing the substrate-side mark, wherein a difference in a predetermined optical property between the predetermined material and the imprint material is larger than a difference in the predetermined optical property between the imprint material and the glass substrate; and aligning the substrate-side mark including the predetermined material and a mold-side mark provided on the mold.

6. A method of manufacturing a replica mold, the method comprising:

forming a first pattern using a predetermined material different from an imprint material and a substrate-side mark using the predetermined material on a replica mold glass substrate by applying the predetermined material onto a surface of the replica mold glass substrate, transferring the first pattern and the substrate-side mark to the replica mold glass substrate by etching the predetermined material, and processing the predetermined material, wherein a difference in a predetermined optical property between the predetermined material and the imprint material is larger than a difference in the predetermined optical property between the imprint material and the replica mold glass substrate;

supplying the imprint material onto the replica mold glass substrate; and imprinting including aligning the substrate-side mark including the predetermined material and a mold-side mark provided on the mold and transferring a second pattern formed on the mold to the imprint material on the replica mold substrate.

7. A method of manufacturing an article, the method comprising:

imprinting including transferring a pattern formed on a mold to an imprint material supplied onto a substrate;

forming a desired substrate-side mark using a predetermined material different from the imprint material by applying the predetermined material onto a surface of the glass substrate, applying the imprint material on top of the predetermined material, transferring the substrate-side mark to the predetermined material by etching the imprint material and the predetermined material, and processing the substrate-side mark, wherein a difference in a predetermined optical property between the predetermined material and the imprint material is larger than a difference in the predetermined optical property between the imprint material and the glass substrate;

aligning the substrate-side mark including the predetermined material and a mold-side mark provided on the mold; and processing the glass substrate on which the pattern is formed in the imprinting.

* * * * *